March 11, 1969

N. E. ALEXANDER 3,432,748

EDDY CURRENT TEST APPARATUS UTILIZING A MOVABLE COIL COUPLED
TO A PIEZOELECTRIC ELEMENT

Filed April 7, 1967

INVENTOR.
Nelson E. Alexander

BY Harry M. Saragovitz,
Edward J. Kelly, Herbert Berl
& Muzio B. Roberto

ATTORNEYS

INVENTOR.
Nelson E. Alexander

United States Patent Office 3,432,748
Patented Mar. 11, 1969

3,432,748
EDDY CURRENT TEST APPARATUS UTILIZING A MOVABLE COIL COUPLED TO A PIEZOELECTRIC ELEMENT
Nelson E. Alexander, Frederick, Md., assignor to the United States of America as represented by the Secretary of the Army
Filed Apr. 7, 1967, Ser. No. 629,875
U.S. Cl. 324—40
Int. Cl. G01r 33/14
2 Claims

ABSTRACT OF THE DISCLOSURE

An apparatus for electrically measuring the thickness or for detecting flaws in a conductive body. A probe having a flat coil and piezoelectric element therein connected by a non-conductive rod. The discharge of a capacitor through the flat coil produces a counter magnetic field on the flat coil which in turn produces a mechanical force on the piezoelectric element. The piezoelectric element produces an electrical output pulse, which is amplified and measured.

---

The invention described herein may be manufactured and used by and for the Government of the United States of America for governmental purposes without the payment to me of any royalties thereon.

This invention relates in general to an apparatus for the detection of flaws and variations of wall thickness and more particularly to an apparatus for the magnetical detection of flaws and variation of wall thickness of metallic structures when only one surface of the metallic structure is available for testing.

Metallic liquid-containing receptacles, e.g., stills utilized in the refining and cracking of hydrocarbons, boilers, automotive fuel tanks and wing tanks of airplanes, may suffer from internal corrosion which is not apparent by external visual examination. Said internal corrosion results in the diminution of the wall thickness of the receptacle. If these weak spots in the walls are not detected, serious consequences may ensue.

The present device comprises two principal parts, i.e., a hand held probe and an electronic chassis that supplies power and read-out. In operation, the discharge of a capacitor through a flat coil, which is located in the interior of the probe and held adjacent to the metal to be tested, produces a magnetic field in the coil that builds up and decays. This magnetic field induces eddy currents in the metal under inspection. The magnitude of these eddy currents is proportional to the electrical conductivity of the metal, which is essentially constant, and to the thickness of the metal. The eddy current produced in the metal under inspection produces a countermagnetic field that reacts on the flat coil, which in turn produces a mechanical force on a piezoelectric element, mechanically coupled thereto and located in the interior of the probe. The piezoelectric element produces an electrical output pulse in response to the mechanical force thereon. The magnitude of the electrical output pulse of the piezoelectric element is proportional to the mechanical force thereon and to the thickness of the metal under inspection. Said electrical output pulse is amplified and measured with a conventional transient peak reading voltmeter. The voltmeter may be calibrated in terms of metal thickness or standardized in terms of thickness changes by taking a reading on an uncorroded area of the metal under test. If the metal is known to be uniform in thickness, the present apparatus may be used for the detection of voids, cracks, or flaws in the metal under inspection that can influence the electrical conductivity in the path of the eddy currents induced by the test pulse.

It is an object of the invention to provide and disclose an improved magnetic detection apparatus capable of detecting changes in metallic wall thicknesses.

It is a further object of the invention to provide and disclose an improved magnetic detection apparatus capable of detecting voids, cracks or flaws in metallic surfaces.

It is a further object of the invention to provide and disclose an improved magnetic detection apparatus of simple design.

It is a further object of the invention to provide and disclose an improved magnetic detection apparatus of a size sufficiently small so as to be portable.

Other objects and a fuller understanding of the invention may be had by referring to the following description and claims taken in conjunction with accompanying drawings, in which:

Figure 1:
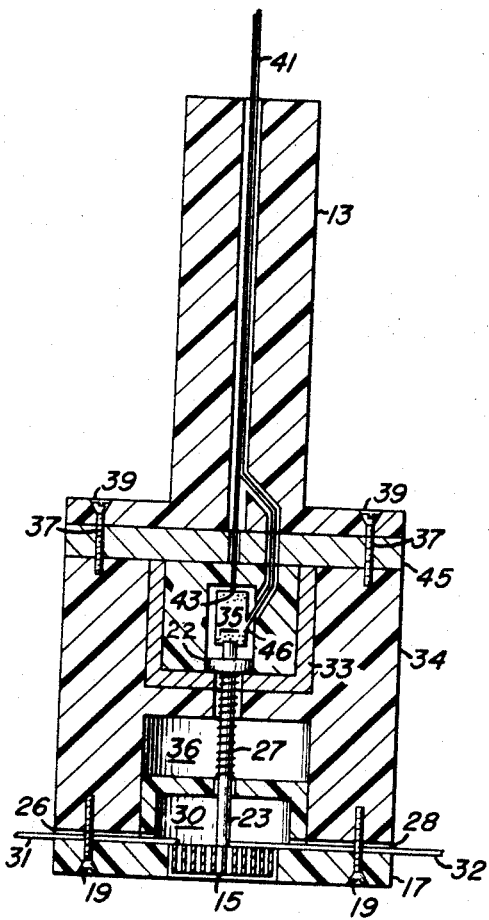
FIG. 1 shows an elevated sectional view of the probe section.
Figure 2:
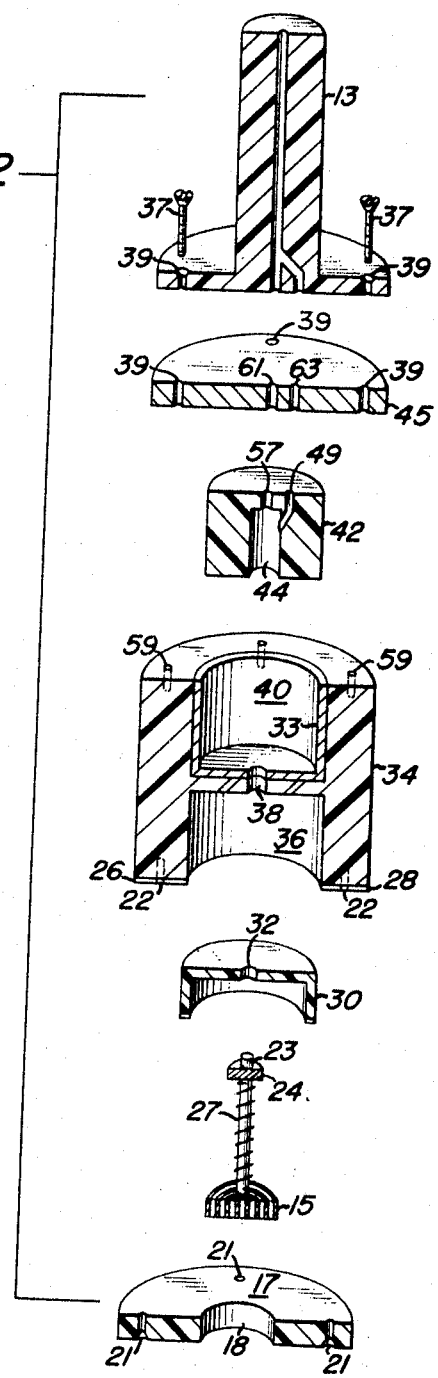
FIG. 2 shows an exploded sectional view of the probe section.

Referring now to the drawings, the probe section of the apparatus comprises a cylindrical configuration having a lower section and reduced upper section 13. The lower section comprises housing 34 which contains lower chamber 36 and upper chamber 40. The two chambers are connected by passageway 38. Associated with housing 34 is bottom component 17 comprising a circular disk having opening 18 in the center position thereof. Extending vertically from the surface of the bottom portion of component 17 to the surface of the top portion thereof are 4 countersunk bores designated 21. The bores are positioned equidistant from each other at a point near the periphery of bottom component 17. When the device is assembled, the bores of bottom component 17 are aligned with tapped bores 22 of the housing which extend from the interior of the housing in a downward direction therefrom. Bottom component 17 is secured to housing 34 by means of threaded screws 19. Opening 18 of bottom component 17 is suitably contoured to receive flat coil 15 which comprises, e.g., ten turns of a copper strip .008″ thick and about ⅛″ wide. The turns of copper strip are insulated with 0.004″ plastic tape having the same width as the copper.

Figure 3:
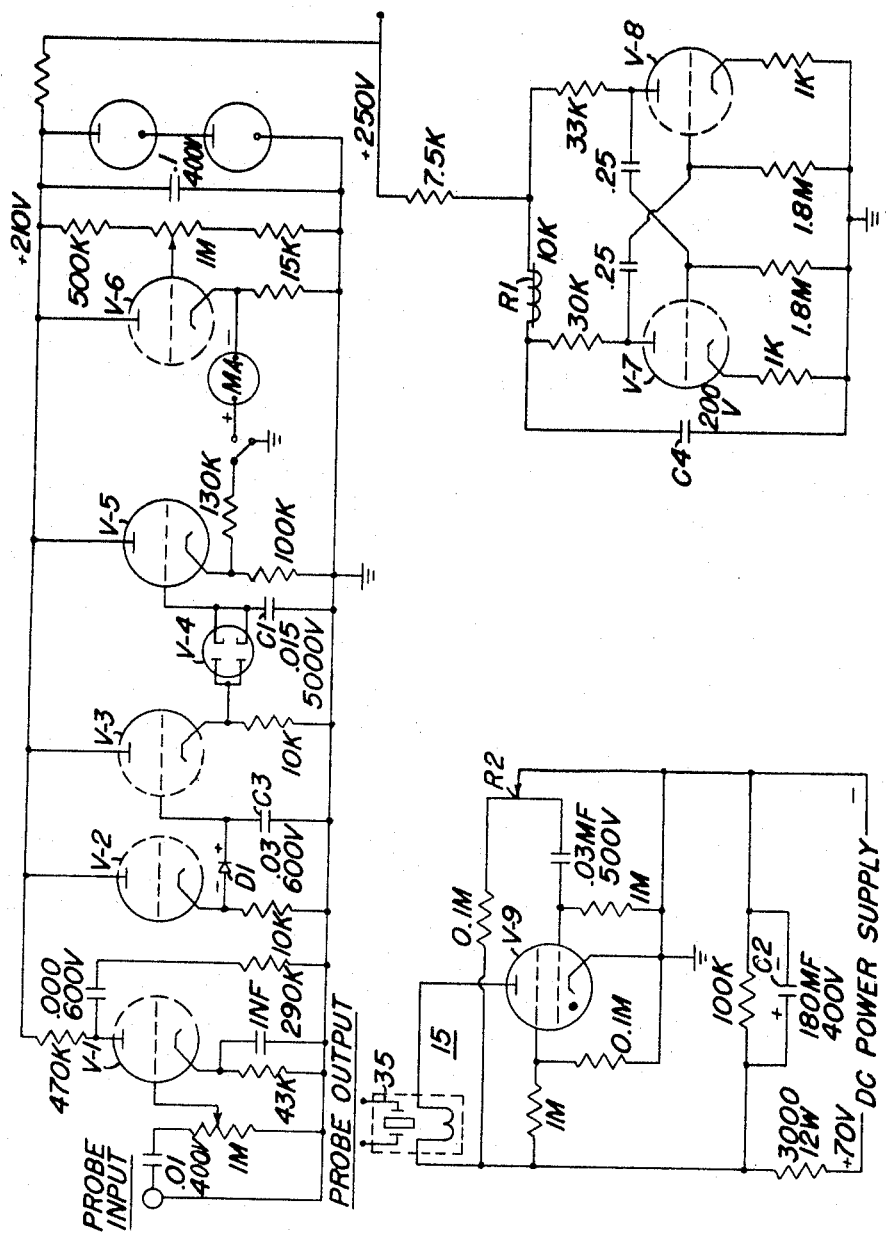
FIG. 3 shows a schematic of the electronic circuitry.

Grooves 26 and 28 extending on a diameter through the lowermost section of housing 34 receive and support flexible leads 31 and 32 which are connected to each end of the completed coil by any suitable means, e.g., soldering. The leads in turn are connected as shown in FIG. 3. Cylindrical rod 23 which comprises disk section 24 near the top section thereof, is secured to the top surface of flat coil 15 in an upright position by any suitable means, e.g., epoxy cement. The rod may be constructed of any suitable non-conductive material. By way of example, a nylon material is considered suitable. Coil spring 27 is positioned circumferentially on rod 23 at a point immediately below disk section 24. Spring support and cylindrical rod guide 30 which comprises an inverted cup shaped configuration cut in two parts along a diameter, is positioned in chamber 36 of housing 34 and rests upon the upper surface of circular disk 17. The flat surface of support 30 comprises bore 32 in the center position thereof of a size sufficient to receive nylon rod 23. In addition, support 30 exerts a compressional force on the lowermost section of coil spring 27 thereby maintaining physical contact between the upermost section of rod 23 of the coil assembly and piezoelectric element 35 and its support insert 42 which is described later. Bore or passageway 38 which comprises a centrally reduced section of interior housing 34, is suitably contoured to pass disc 24 of the coil assembly. Insert 42, which comprises a cylindrical shaped configuration containing bore 44 extending axially partially therethrough at the center position thereof, is positioned within upper chamber 40 of housing 34 so that passageway 38 connects with bore 44. Bore 44 comprises reduced section 57. In addition, insert 42 comprises bore 49 extending from the top surface thereof, through the interior of insert 42 and connects with bore 44. Bore 44 serves as a receptacle for the piezoelectric element which will be described later. Chamber 40 is lined with metal shield 33, e.g., soft iron or MU metal laminated with copper, to minimize the pick up of any stray electromagnetic or electrostatic charges by the piezoelectric element which is positioned in bore 44.

Brass cylindrical anvil 45 provides an inertia element and with handle 13 or the reduced cylindrical upper section of the device, completes the enclosure of upper chamber 40 of housing 34. Four countersunk bores designated 39 extend through anvil 45 in a vertical direction from the surface of the lid portion of component 13. The bores are positioned equidistant from each other at a point near the periphery of the lid portion of component 13. When the handle portion of component 13 and anvil 45 are properly aligned, bores 39 thereof connect with tapped bores 59 of housing 34 which extend from the surface thereof in a downward direction therefrom. Component 13 and anvil 45 are secured to housing 34 by means of threaded screws 37, as shown in FIG. 1. In addition, anvil 45 comprises bores 61 and 63 extending from the surface thereof in a vertical direction therethrough. When anvil 45 is secured to housing 34, bore 61 connects with reduced section 57 of bore 44 and bore 63 connects with bore 49 of insert 42 thereby providing means for the passage of leads 41 from the piezoelectric element to the amplifier input.

Piezoelectric element 35 comprises a commercially available cylinder of polycrystalline modified lead zirconate titanate ceramic which is silver plated on both the inner and outer surfaces for better electrical connections. Leads 41 are connected to piezoelectric element 35 at exterior point 43 and interior point 46 as shown in FIG. 1.

In operation the discharge of capacitor C2 as shown in FIG. 3, through flat coil 15 which is located in the probe and held adjacent to the metal to be measured, produces a magnetic field that builds up and decays with the discharge pulse of current. Multivibrator circuit V-7 and V-8 establishes the discharge repetition rate. This magnetic field induces eddy currents in the metal under test that produces a countermagnetic field which reacts on the flat coil to produce a mechanical force. This mechanical force is transmitted to the piezoelectric element 35 by means of push rod 23 and disk section 24 thereof, which is positioned in contact thereto by spring 27. The element is pressed between insert 42 backed up by anvil 45 and disk section 24 of push rod 23. An electrical voltage is thereby produced. The voltage output from the piezoelectric element in the probe is amplified by electron tubes V-1 and V-2. V-2 is a cathode follower and its cathode circuit contains a pulse stretching circuit consisting of diode D1 and a 0.03 microfarad capacitor C3. The pulse is further amplified by V-3 and its cathode output is used to charge capacitor C1 through twin diode V-4. Electron tubes V-5 and V-6 and a 0-100 microammeter designated MA comprise a conventional vacuum tube voltmeter that indicates the voltage across the terminals of C1. As each input pulse is received, the microammeter reads a maximum representing the height of the pulse that gradually drops back due to the leakage of the charge from C1 until renewed by the next pulse. As the probe is moved over the surface of the metal, the maximum reading of each pulse is indicative of the thickness of the metal at that point.

Electron tubes, designated V-7 and V-8 are connected as a multivibrator with a frequency of approximately one cycle per second and determined by the value of capacitor C4. Relay R1 in the plate circuit of V-7 is actuated once per cycle, closing contact R2 in the grid circuit of V-9 thereby causing it to fire. V-9 is a cold cathode Thyratron that discharges capacitor C2 through the inductor coil in the probe. Conventional power supplies furnish the necessary 250 volts DC for the voltmeter and the 70 volts DC utilized to charge the capacitor. Isolation of input and output voltage in the probe is aided by a large difference in electrical impedance. The coil impedance is very low, while the piezoelectric element has a very high impedance and is not greatly influenced by a magnetic field. The latter characteristic simplifies shielding requirement.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

Having described my invention I claim:

1. An eddy current test apparatus for the electrical measurement of the thickness of, or the presence of voids, cracks or flaws in an electrically conductive body comprising, a housing adapted to be placed adjacent said body, a coil and piezoelectric element means encompassed within the housing, said coil being movably mounted therein, a rigid insulating means connecting said coil means with said piezoelectric element means, charged capacitor means connected across said coil, means connected to said capacitor means to periodically discharge said capacitor means through said coil thereby generating a pulsed magnetic field in said coil which field induces eddy currents in said body, leads connecting said piezoelectric element to amplifying means, and a calibrated voltmeter means connected to the amplifying means whereby when said housing is placed adjacent said body the pulsed magnetic field reacts with the countermagnetic field due to said eddy currents to produce a force on said coil which force is transmitted to said piezoelectric element thereby causing an output from said element indicative of the thickness of the body or the presence of voids, cracks or flaws.

2. The apparatus in accordance with claim 1 wherein said means to discharge includes a multivibrator means.

References Cited

UNITED STATES PATENTS 2,530,178  11/1950  Rathkamp _____ 324—43
2,105,479  1/1938  Hayes _____ 324—34

FOREIGN PATENTS 857,459  12/1960  Great Britain.

RUDOLPH V. ROLINEC, Primary Examiner.

R. J. CORCORAN, Assistant Examiner.

U.S. Cl. X.R.

310—8